United States Patent

[11] 3,563,266

| [72] | Inventor | Harry E. Berry<br>3510 S.W. 32nd Ave., Hollywood, Fla. 33023 |
|---|---|---|
| [21] | Appl. No. | 777,845 |
| [22] | Filed | Nov. 21, 1968 |
| [45] | Patented | Feb. 16, 1971 |

[54] QUICK-CONNECT CONVERSION ADAPTER FOR BEER KEGS
4 Claims, 5 Drawing Figs.

[52] U.S. Cl................................................. 137/323,
251/149.6
[51] Int. Cl...................................................... F16k 43/00
[50] Field of Search........................................... 137/212,
320, 321, 322, 328, 323, 613, 614, 614.02,
614.03, 614.04, 614.05, 614.06, 614.2, 614.21;
251/149, 149.1, 149.5, 149.6, 291, 339, 349, 350;
222/396, 397

[56] References Cited
UNITED STATES PATENTS
| 2,451,218 | 10/1948 | Hengst .................. | 137/614.03X |
| 2,545,620 | 3/1951 | Lamoureux................. | 137/323 |
| 3,371,679 | 3/1968 | Minella ....................... | 137/328 |

*Primary Examiner*—William F. O'Dea
*Assistant Examiner*—David R. Matthews
*Attorney*—Mason, Fenwick and Lawrence ABSTRACT: An adapter for enabling the use of quick-connect couplings on conventional beer kegs of the type having a recess butterfly valve on the end of a valve body cup on the interior of the keg, the adapter being a cylindrical tubular body member having one end fitting over a rotatable shaft type actuator for the butterfly valve and having a radially extending flange with a resilient sealing means adjacent the flange and radially extending lugs extending from the flange for engaging an inclined shoulder on the inner surface of the valve body cup so that rotation of the adapter seals the adapter in the valve body cup and also opens the butterfly valve so that all flow must be directed through the adapter.

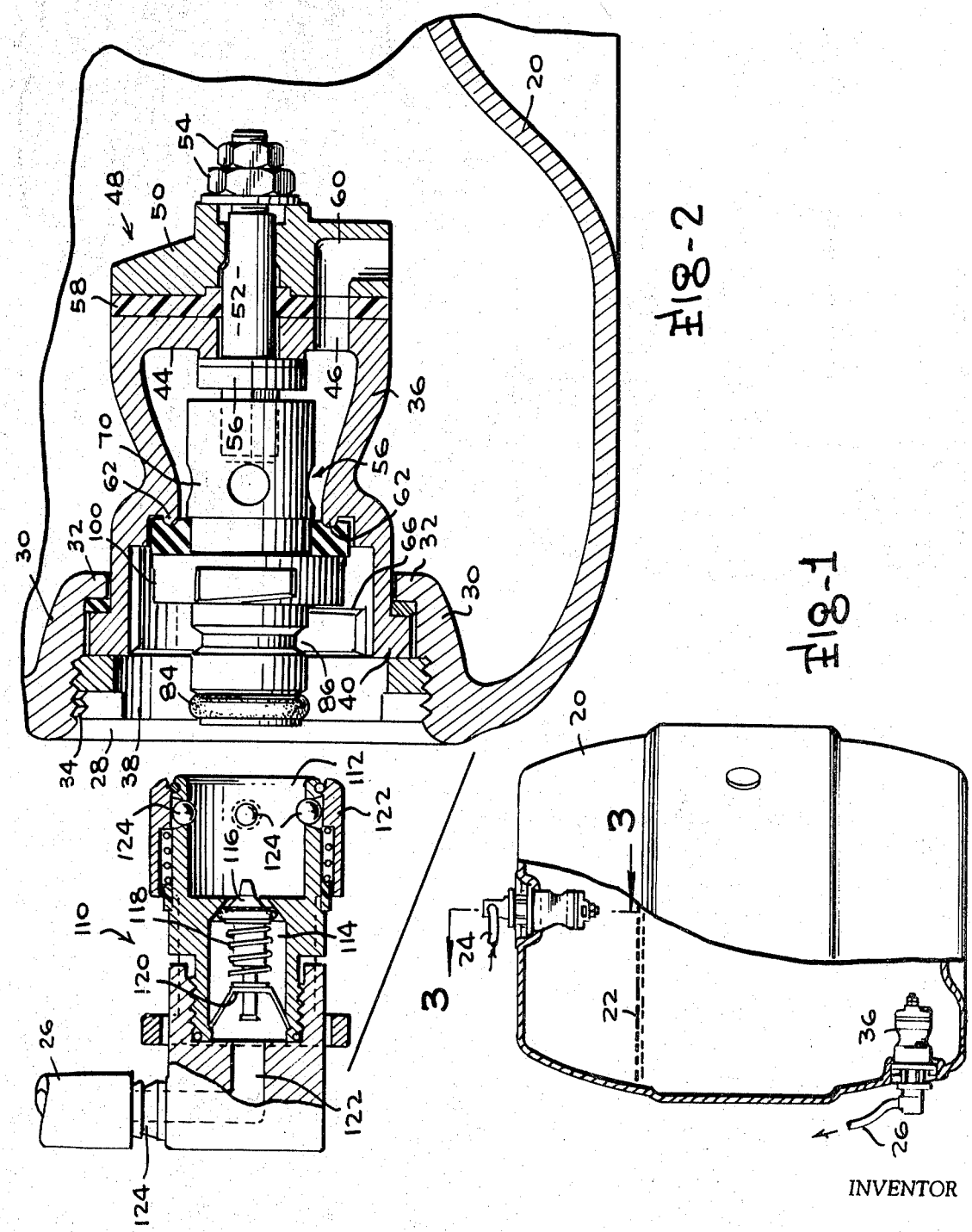
INVENTOR
HARRY E. BERRY
BY Mason, Fenwick & Lawrence
ATTORNEYS

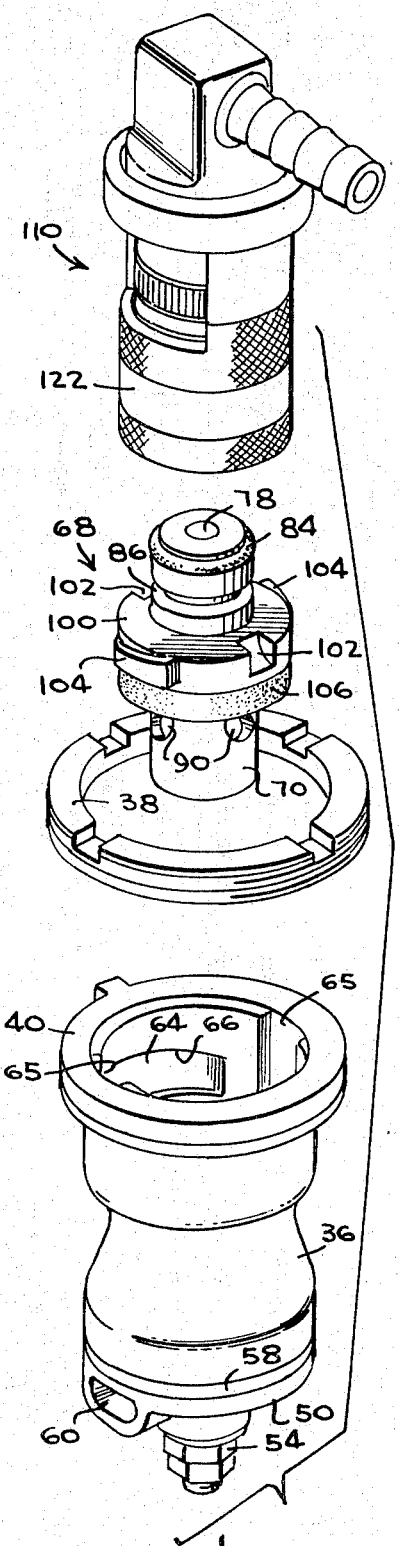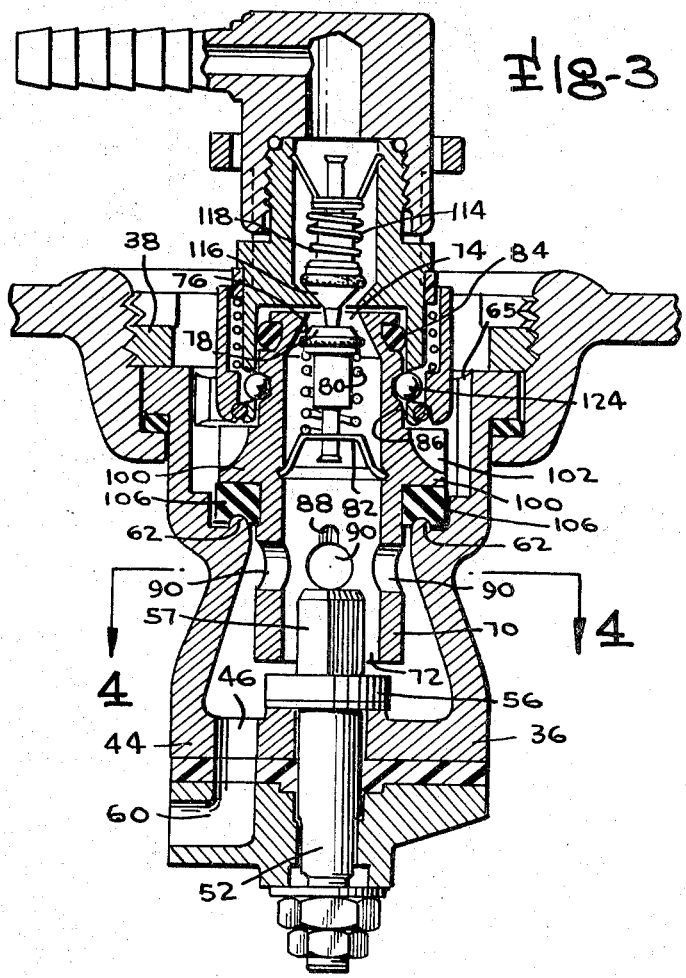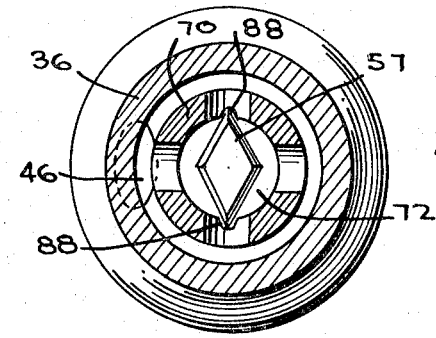

QUICK-CONNECT CONVERSION ADAPTER FOR BEER KEGS

BACKGROUND OF THE INVENTION

This invention relates to the field of fluid dispensing, and is more particularly related to adapter means for use in association with conventional beer kegs for enabling the use of modern quick-connect hose couplings with such kegs in place of the previously known twist couplings which have suffered numerous deficiencies. The particular keg with which the instant invention is associated is known in the trade as a "golden gate" type keg and has been in use for many years.

The "golden gate" keg is provided with a larger opening to which a hose for receiving beer from within the keg is connected and another opening to which a gas hose is connected for pressurizing the keg to enable flow of beer therefrom.

The means for enabling connection of the gas hose and the larger hose to the keg are identical on the conventional keg and include a recessed valve body cup connected to the wall of the keg and extending into the interior of the keg. The innermost endwall of the valve body cup includes a butterfly valve which is rotatable to open and close a passageway in the endwall leading to the interior of the valve cup from the interior of the keg. A valve actuator in the form of an axially oriented rod is provided on the innermost wall end of the valve cup. Connection of a hose to the valve cup of the previously known system is enabled by a right angle pipe having its outer end connected to the hose and its inner end provided with an aperture which matingly fits over the valve actuator so that the pipe is axially inserted to a position in which the opening in the end thereof fits over the valve actuator and is then subsequently twisted to open the butterfly valve. The twisting movement also causes the pipe to form a sealed fit in the valve cup and allow the flow of fluid or gas through the pipe and valve cup to or from the interior of the keg.

A great shortcoming of the previously known aforedescribed devices resides in the fact that the twisting movement required for connecting the pipe to the keg in the valve cup places stresses on the hose connected to the pipe and eventually results in such wear and tear on the hose as to result in rupture of same. The consequences of such rupture can be most disastrous such as a flooded draft box, loss of many gallons of beer, etc.

Moreover, another disadvantage of the known system is derivative from the fact that the butterfly valve employed in the valve cup requires considerable force for opening and/or closing movement and the person attaching or removing the pipe connector must have and employ a considerable strength. Consequently, couplings of this type cannot be used by barmaids or others not possessing the required strength for turning same in order to open the butterfly valve and seal the connector pipe in the valve cup.

Still another disadvantage of the previously known devices of this sort is that the connector pipe must be rotated to a given angular position with respect to the valve cup before it can be inserted into the valve cup for connection thereto. Consequently, this rotation also twists the hose and it is often difficult to connect the pipe to the valve cup when there is insufficient length of hose or the positioning of the relative parts is awkward.

Still another serious shortcoming of the previous prior art devices of this type resides in the fact that the pressurized gas delivery hose connection for connecting the pressurized gas line to the keg and the larger hose connection are identical size; consequently, the lager hose can be connected to the gas delivery valve and vice versa. As a consequence of this, it quite frequently occurs that kegs are improperly connected and are, consequently, inoperable. While this usually causes no great damage, it is the cause of great inconvenience since the hoses must be reconnected in their proper manner.

Yet another very serious shortcoming of the prior art devices resides in the fact that each connection and disconnection of the prior known devices requires that the butterfly valve on the end of the valve cup be either opened or closed. Eventually, the opening and closing of the butterfly valve results in the leakage therefrom and repair or replacement must be accomplished.

Still another serious shortcoming of the previously known prior art devices of the aforementioned type resides in the fact that the pipe coupling employs a pair of lugs engageable with an inclined surface on the interior of the valve cup for forcing the pipe connector inwardly in the valve cup for sealing and connecting the pipe connector to the cup. Since these lugs are subjected to high frictional forces and abrasion, they eventually wear to such an extent that they do not provide adequate force for sealingly connecting the pipe within the valve cup. Consequently, the coupling must be replaced. This wear and tear is accelerated by virtue of the fact that the couplings must be twisted for each insertion and removal from the valve cup so as to consequently wear and remove metal from the surfaces of the lugs.

Also, each hose connection to a keg requires that the resilient sealing means on the pipe member be compressed and forced into sealing fit with the valve cup. Consequently, the resilient sealing members also eventually wear and require replacement.

Although the aforediscussed deficiencies of the currently employed kegs are well known, no adequate solutions to such problems have been found prior to the instant invention. One of the primary problems in solving the problems resides in the fact that thousands of kegs of the aforementioned type are currently in use by the breweries in this country with the largest brewer being one of such users. Therefore, it is imperative that any solution to the problems would require that the keg being currently employed be convertible without requiring replacement of the kegs. Moreover, since the conversion of a beverage dispensing system from one form to another requires considerable time, it is highly desirable that the kegs retain capability for usage both in the old system and the new system while the conversion is taking place, since it would obviously be impossible to provide an instantaneous changeover for all bars and other places at which draft beer is dispensed. Moreover, the various breweries have vast sums invested in keg cleaning equipment and other handling equipment which would require expensive conversion if a new type keg or radically different connector system should be employed.

Therefore, the brewing industry has long sought the means which would enable the use of modern quick-connect couplings which can be easily connected to the conventional kegs with a minimum of effort and with absolutely no necessity for twisting or turning the hose. The desirability of being able to use such quick-connect couplings is all the more desirable since the male and female portions of such couplings do not have to be relatively positioned in any predetermined rotative orientation about their axis in order to be connected to each other. Therefore, being able to use such a coupling would completely eliminate the necessity for twisting the hose to which the coupling is connected.

The instant invention solves the problems of the prior devices in an extremely efficient manner. Specifically, the instant invention is connectable to the valve cup of known keg designs in the brewery at which time the butterfly valve on the cup is opened by the connector of this invention. The connector provides a substantially permanent installation and has a male portion of a quick-connect coupling formed on and in its outer end to which a female portion of such a coupling can be connected by merely axially moving the female connector over the male portion. This connection does not require any twisting or turning of the hose connected to the female portion. Moreover, the female connector can be fitted over the male connector in any relative rotative position with respect thereto. Additionally, once the connector means of this invention is inserted in the valve cup, the butterfly valve remains open and is rarely operated so that there is practically no wear and tear of same. Moreover, since the connector remains in the valve cup in a more or less permanent manner, there is no wear or tear on the lugs associated with the connector of this invention and a tight seal is maintained between the connector and the cup member. Additionally, there is little or no wear or tear on the resilient means providing the seal.

The instant invention, on the other hand, can be easily removed in order to allow the keg to be used with the previously employed devices in bars which have not been converted to quick-connect coupling equipment. This is true because the coupling of this invention requires absolutely no modification or alteration of the previously known valve cup and keg means and consequently provides a tremendous advantage and savings when a brewery is making the changeover from the old system to the new system.

SUMMARY OF THE INVENTION

Therefore, it is the primary object of this invention to provide a new and improved conversion means for liquid dispensing apparatus.

More specifically, it is the primary object of this invention to provide a new and improved adapter for enabling the use of modern quick-connect couplings with conventional older style beer kegs without requiring modification of such kegs.

Obtainment of the object of this invention is enabled through the provision of an adapter receivable in the valve body cup of the conventional "golden gate" type keg and being on one end in the form of the male portion of a modern quick-connect coupling member. The adapter is formed of a cylindrical tubular body portion having a passageway extending throughout its axial length. The inner end of the body portion spaced inwardly within the keg is dimensioned to matingly fit over the end of a valve actuator in the form of a rotatable shaft so that rotation of the adapter member serves to rotate the shaft. Such rotation of the shaft serves to open or close the conventional butterfly valve adjacent the base of the valve body cup. The adapter includes a radially extending flange having an inner base against which is positioned a washer or other resilient seal member and also having a pair of radially extending lugs extending outwardly from its outer periphery. The lugs engage the inclined groove or abutment in the wall of the valve body cup so that rotation of the device causes the adapter to be moved inwardly to forcefully position the resilient sealing means against an annular sealing or seating surface. Also, rotation of the adapter member in a direction causing such to move inwardly into the keg also serves to open the conventional butterfly valve adjacent the base of the valve body cup. A check valve is provided in the outer end of the passageway of the adapter member and the outer end of the adapter member is in the form of the male coupling member of a quick-connect coupling. The face of the radially extending flange on the adapter member is provided with recesses on opposite sides for engagement by a spanner wrench to enable rotation of the adapter member.

The primary advantage of the subject invention that it enables the use of modern quick-connect couplings which can be connected to the keg in a manner much more easy than the previously known hose connector means employed with kegs of this type. Moreover, the female coupling which is connected to the hose being connected to the keg requires no specific rotary alignment with respect to the male coupling member and can be connected thereto by merely pushing the female coupling over the male coupling member. No great skill or strength is required for coupling the elements together and practically any person either male or female can consequently easily connect the keg for beverage dispensing purposes. Additionally, there is little or no wear and tear on the hose members associated with the female coupling elements.

DESCRIPTION OF THE DRAWINGS

FIG. 1 is a front elevational view of a beer keg employing the subject invention and having a portion removed for clarity of illustration of same;

FIG. 2 is a bisecting sectional view of the lower connector and portion of a keg employing the preferred embodiment of the subject invention with the parts being illustrated in nonconnected position;

FIG. 3 is a sectional view taken along lines 3-3 of FIG. 1;

FIG. 4 is a sectional view taken along lines 4-4 of FIG. 3; and

FIG. 5 is an exploded perspective view of the preferred embodiment of the invention as associated with cooperating keg elements.

DESCRIPTION OF THE PREFERRED EMBODIMENT

The preferred embodiment of the subject invention is illustrated in conjunction with a beer dispensing apparatus including a container or keg 20 having a quantity of beer 22 on its interior. A gas line 24 consisting of a flexible hose is connected to a fitting in the upper end of the keg for allowing pressurized gas to be injected into the key above the surface of the beer. A lager or liquid line 26 in the form of a flexible hose is connected to a fitting adjacent the lower end of the keg for allowing the pressurized air above the beer to force the beer outwardly through lager line 26 to a bar or other dispensing area. Each of the couplings to which the hoses are connected are of identical construction with the exception that they may be of different dimensions so that the gas and liquid couplings will not be interchangeable.

FIG. 2 illustrates the lower or lager flow portion which includes a circular inwardly extending opening 28 into which valving and connector components are mounted. Opening 28 is defined by a generally annular flange 30 extending in from the outer wall of the keg 20 and terminating in an annular sealing flange 32. Threads 34 are formed adjacent the outer end of opening 28.

A valve body cup 36 is received within opening 28 and is biased toward the annular flange 32 by means of a threaded retainer ring 38 threadably engaged with threads 34 in an obvious manner as illustrated in FIG. 2. The outermost end of valve body 36 is provided with a radially extending flange 40 which engages a sealing ring 42 which is clamped between flange 40 and the annular sealing flange 32. Valve body cup 36 is provided with an endwall 44 forming its innermost extent and having a passageway 46 extending therethrough.

Fluid flow through opening or passageway 46 is controlled by means of a rotary butterfly valve generally designated 48 and consisting of a rotary shutter member 50 connected to a shaftlike rotatable valve actuator 52 to which shutter 50 is fixedly connected and retained in position by nuts 54. The outer end 57 of the valve actuator 52 is in the cross-sectional form of a parallelogram as illustrated in FIG. 4.

The extent of inward movement possible for rotary valve actuator 52 is limited by a radially extending annular abutment flange 56 on actuator 52 which engages endwall 44. A flat seal 58 formed of Teflon or the like is located between the shutter member 50 and the outer end of the endwall 44 so that tightening action of nut 54 serves to bias the shutter 50 towards seal 58 in an obvious manner. Opening 46 extends through seal 58 as shown in FIG. 2 and a right angle passageway 60 in the shutter member 50 is positionable in alignment with passageway 46 to allow the passage of fluid or gas therethrough. However, rotation of shutter member 50 to a second position moves passageway 60 away from alignment with passageway 46 so that no flow can pass between the interior of the keg and the interior of the valve body cup 36 when the shutter is in said second position. The positioning of the shutter is accomplished by rotation of the rotatable valve actuator 52.

An annular shoulder or extending surface 62 extends outwardly from the wall of the valve body cup 36 as shown in the drawings. Also, the outer end of the interior of the valve body cup 36 is provided with two spiral grooves 64 on its interior surface separated by axially parallel slots and each having a top abutment surface 66 as shown in FIG. 5.

The keg and valve body cup construction discussed above is conventional and has been employed for many years. The conventional connector previously associated with this construction comprises a pipe having a pair of aligned lugs diametrically aligned which must be aligned with each of slots 65, (FIG. 5), then moved inwardly into the keg and to be subsequently rotated to a final position. The end of the pipe matingly fits over the end portion 57 of the valve actuator so that the rotation of the pipe serves to open the butterfly valve 48 in an obvious manner and also serves to tightly draw the pipe into the valve body in a sealed relationship. Removal of the conventional connector requires reverse rotation for closing the butterfly valve and subsequently moving the end of the pipe from within the confines of the valve body cup 36.

This invention comprises an adapter 68 which is mounted within the valve body cup in a more or less permanent manner for enabling the use of the modern quick-connect hose couplings to the keg 20 to avoid the inconvenience and other disadvantages of the previously known system described and discussed above.

Adapter 68 consists of a generally cylindrical body member 70 having an axially extending passageway 72 extending its entire length and terminating on its outer end in a flow opening 74 (FIG. 3). Flow opening 74 is formed with an interior conical valve seat against which a conical check valve member 78 is biased by a spring 80. The end of spring 80 not in engagement with the conical check valve 78 is engaged by a spider member 82 within passageway 72 as shown in FIG. 3. Consequently, spring 80 constantly biases the conical check valve 78 towards the conical valve seat 76.

A seal 84 encircles the outer end of the body member 70 and a groove 86 extends circumferentially about the body member inwardly from seal 84 as best shown in FIG. 5.

The innermost end of the wall passageway 72 in the cylindrical body member is provided with first and second axially parallel slots 88 which fit over opposite corners of the parallelogram shaped end 57 of the valve actuator 52 as shown in FIG. 4. Consequently, rotation of the body member 70 will serve to rotate the valve actuator 52 to position the shutter member 50 in an obvious manner. Four radial openings 90 extend through the body member to allow the flow of liquid between the interior passageway 72 and the surrounding space of the valve body cup; moreover, flow can also enter and exit outwardly to the innermost end of passageway 72 surrounding the ends 57 of actuator 52 as will be evidenced from inspection of FIGS. 3 and 4.

A sealing flange 100 extends outwardly from body member 70 immediately below the groove 86 as shown in FIGS. 3 and 5. Sealing flange 100 has a pair of diametrically opposed openings 102 on its upper peripheral surface for receipt of the ends of a spanner wrench for turning the adapter member to insert same in the valve body cup 36. First and second inclined lugs 104 extend outwardly from opposite sides of the periphery of the sealing flange 100 to be engageable with the grooves 64 on the inner wall of cup 36. A resilient ring type seal 106 is located immediately adjacent the sealing flange 100 so that inward movement of the adapter causes the resilient seal 106 to engage the shoulder 62 as shown in FIG. 3.

Adapter 68 is inserted in the valve body cup 36 by aligning the inclined lugs 104 with slots 65 (FIG. 5) in the valve body cup and moving the adapter inwardly into the cup until the ends are in alignment with the grooves 64; this movement also serves to matingly position slots 88 over the corners of the end 57 of the valve actuator 52. A spanner wrench is then inserted in openings 102 to rotate the adapter member in a clockwise direction to cause same to forcefully move downwardly to press the sealing means 106 against the shoulder 62. Also, the rotative movement of the adapter member serves to rotate the valve actuator 52 so as to open the butterfly valve 48 in an obvious manner. Consequently, communication is provided by passageway 46 between the interior of the valve cup 36 and the interior of the keg in which the valve cup is mounted. It should be noted that the adapted member can be easily removed by rotation in a counter clockwise direction and subsequent extraction from the valve cup so as to enable usage of the valve cup with the prior known angle type pipe means previously used for connection to such.

The outer ends of the adapter member including the seal 84, opening 74 and groove 86 comprise the male coupling portion of a quick-connect coupling of the type manufactured by the Hansen Manufacturing Company of Cleveland, Ohio or the Cornelius Company of Anoka, Minnesota. The female portion 110 of the quick-connect coupling manufactured by the above companies includes an opening 112 (FIG. 2) which is dimensioned to fit over the end of adapter member 68. The female coupling 110 is of conventional construction as was noted previously and also includes a passageway 114 communicating with opening 112 but normally closed to such communication by a conical check valve 116 biased towards opening 112 by a spring 118 which has its other end engaging a spider 120. A disconnect sleeve 122 embraces the outer end of the female coupling member 110 and is axially movable to allow retaining spheres 124 to retain the coupling in position when said spheres are engaged in slot 86 in the manner illustrated in FIG. 3. A right angle passageway 122 communicates with passage 114 and extends outwardly through a hose retaining connector 124. It should be noted that check valve 116 remains closed by action of spring 118 so that pressure in the hose connected to the female connector cannot flow out of the connector when the same is disconnected as shown in FIG. 2.

Female connector 110 is connected to a keg by positioning same in alignment with the adapter member 68 in the manner illustrated in FIG. 2. The female connector is then moved axially inward over the end of the adapter member until the position illustrated in FIG. 3 is reached. In the FIG. 3 position, the retainer spheres 124 retain the female member in locked position over the male member. Moreover, the end of check valve 116 engages the check valve 78 so that springs 118 and 80 are compressed to allow opening 74 to communicate with the interior passageway 114 of the female connector as illustrated in FIG. 3. Therefore, it will be apparent that the hose can be connected to the keg by merely axially moving the female connector over the end of the male connector until locking engagement of the two easily accomplished with absolutely no twisting of the hose.

Various modifications of the adapter member will occur to those skilled in the art and it should be understood that the spirit and scope of this invention is to be limited solely by the appended claims.

I claim:

1. An adapter means for enabling the long-term use of quick-connect coupling means with a beer keg of the type having an inwardly extending hollow valve body cup extending inwardly from a wall of the keg with a rotary butterfly valve on the innermost endwall of the cup operable through rotary movement of a rotary axial valve actuator having a first end within the interior of said valve body cup and mounted for rotation on said endwall for movement between first and second positions respectively opening and closing a passageway extending through said endwall to respectively provide or prevent communication between the interior of said keg and the interior of said valve body cup, said adapter comprising a generally cylindrical body member having an outer end and an inner end, said inner end of said cylindrical body member including an opening matingly engaging said first end of said valve actuator when said valve adapter is rotated so as to consequently open or close said butterfly valve in accordance with the direction of rotation of said adapter member, the entire length of said generally cylindrical body member being less than the distance between said innermost endwall of said valve body cup and the outer surface of the wall of the keg adjacent said body cup so that said outer end of said generally cylindrical body member is located within the peripheral confines of the outer surface of said keg wall, an axial passageway extending through said body member between said outer end and said inner end, a check valve member mounted in said axial passageway adjacent said outer end of said body member for normally closing said passageway, a radially extending sealing flange extending outwardly from said body member, resilient sealing means adjacent one side of said radially extending flange, a pair of locking lugs extending outwardly from said radially extending flange and engageable with an inclined spiral groove on the interior of said valve body cup so that rotation of said body member in a first direction causes said body member to be forcefully moved inwardly to a relatively permanent operative position in which it remains unless removed for maintenance, said inward movement of said body member also serving to compress said sealing means against a rigid shoulder extending inwardly from said valve body cup and male coupling means on the outermost end of said body member for matingly receiving and retaining a female quick-connect coupling axially inserted over said male coupling means to provide fluid communication between said axial passageway and said female coupling.

2. The invention of claim 1 additionally including recess means on the outer face of said sealing flange for receiving a spanner wrench to enable rotative movement of said adapter means.

3. The invention of claim 2 wherein said adapter means includes a plurality of radial passageways extending through said body portion adjacent the innermost end of said adapter member for providing communication between the interior of said valve body cup and said passageway extending through said adapter member.

4. The invention of claim 3 wherein said check valve comprises a spring-biased conical valve member urged against a conical valve seat on the outer end of said adapter member.